Feb. 24, 1942.  J. F. INDERDOHNEN ET AL  2,274,479
DEVICE FOR MEASURING FLUID PRESSURES
Filed July 22, 1939   2 Sheets-Sheet 2
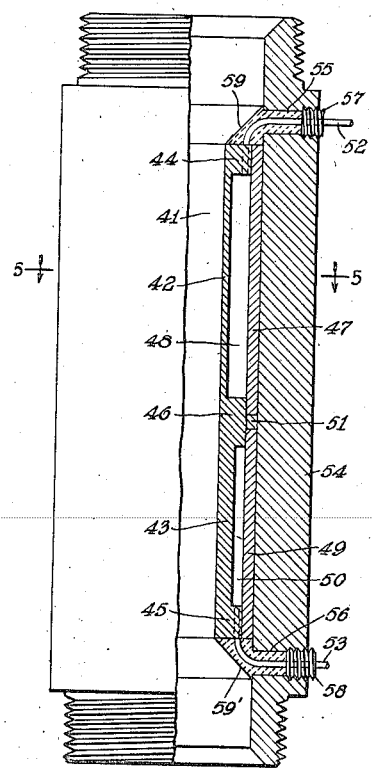
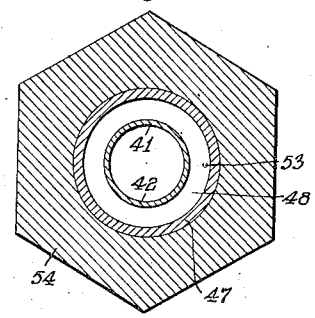
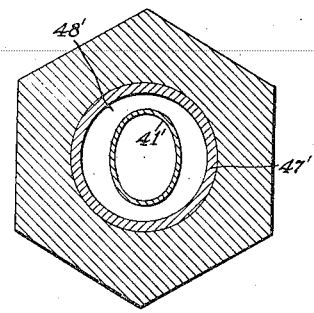
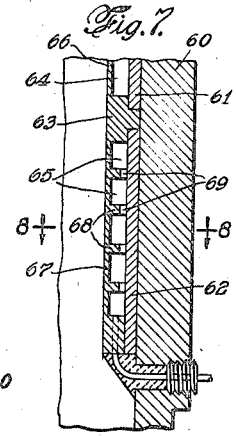
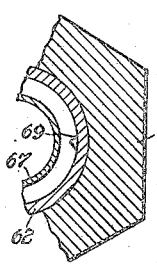
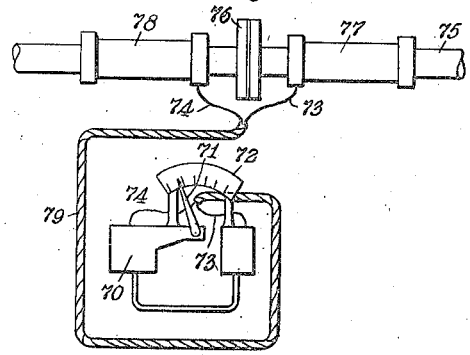
INVENTORS
JOHN F. INDERDOHNEN
AND ALPHONSO NOBLE
BY
ATTORNEY.

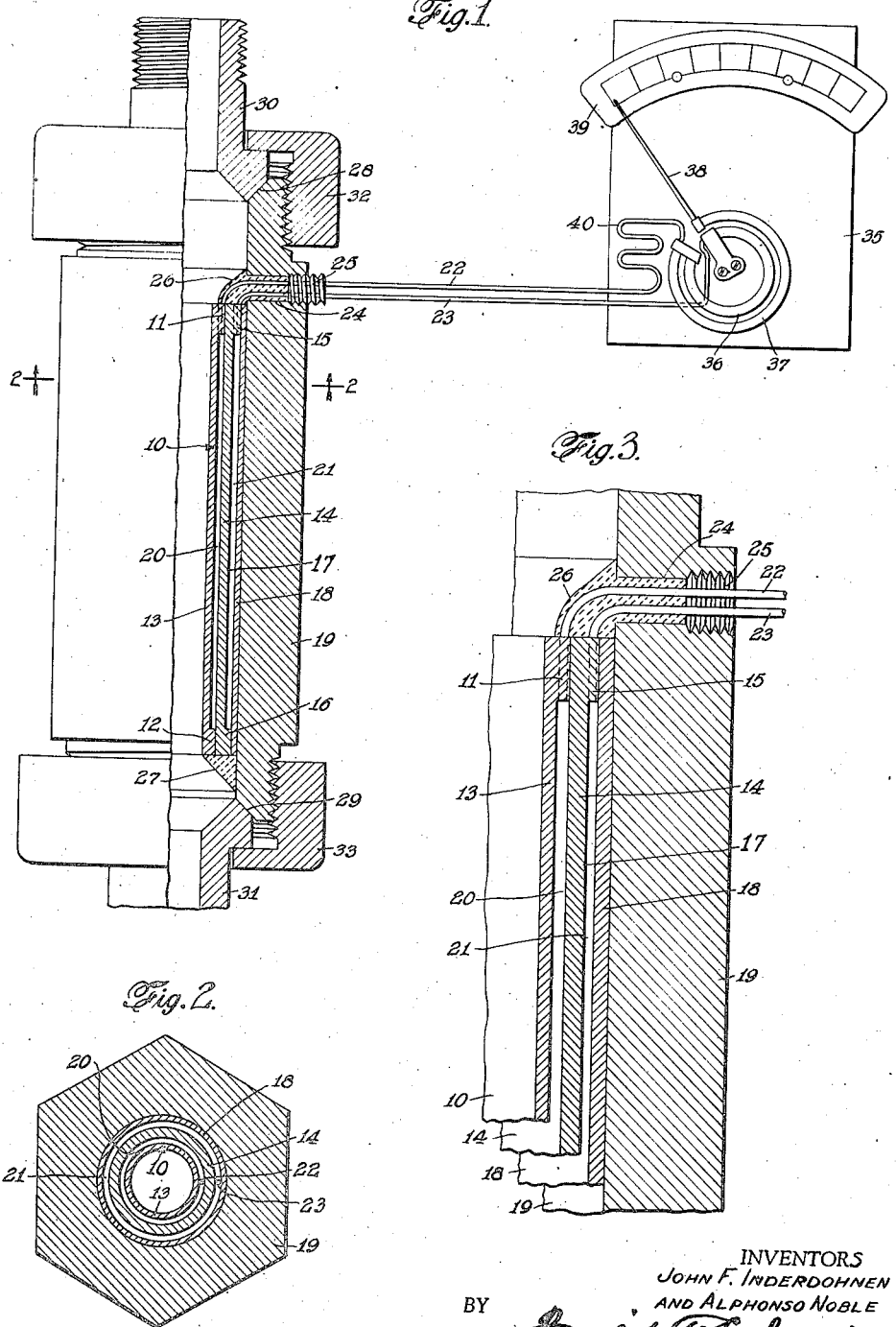

Patented Feb. 24, 1942

2,274,479

UNITED STATES PATENT OFFICE 2,274,479

DEVICE FOR MEASURING FLUID PRESSURES

John F. Inderdohnen, Milwaukee, Wis., and Alphonso Noble, Naugatuck, Conn., assignors to The Bristol Company, Waterbury, Conn., a corporation of Connecticut Application July 22, 1939, Serial No. 285,852

9 Claims. (Cl. 73—31)

This invention relates to devices for measuring fluid pressures, and more especially to means for isolating a measured fluid from a measuring instrument when such fluid may be either of a corrosive nature, or subject to contamination, or otherwise unsuited to direct contact with interior parts of an instrument, and is particularly adapted to such use when the pressures involved may be of relatively high values.

In the measurement of properties of corrosive fluids, there are many instances where a suitable measuring unit cannot be designed to withstand the action of such fluids in its delicate interior parts, whereas a relatively simple tubular structure may be constructed of a material not subject to damage by said fluids. Again, in the measurement of fluids containing solid matter in suspension or such objects as chips, as in the case of a sulphite digester, these materials have a tendency to clog the constricted passages of measuring elements and render the instruments inoperative.

Also, in modern dairy practice, particularly in the process of viscolizing or homogenizing, the milk is submitted to high pressures of the order of from 500 to 3,000 lbs. per square inch; and it will be obvious that the conventional forms of pressure gauges, involving Bourdon springs or pistons directly exposed to the liquid, provide pockets or interstices wherein may collect milk or undesirable decomposition products therefrom, and that such devices are inherently difficult, if not impossible, to clean and sterilize and maintain in a sanitary condition.

It is an object of this invention to provide a pressure-sensitive element adapted for the transmission of fluid pressures to a measuring unit, while maintaining complete isolation between the measured fluid and the interior parts of the unit.

It is a further object of the invention to provide a device of the above nature which shall be free of pockets or crevices wherein undesirable matter may accumulate.

A still further object of the invention is to provide means whereby changes in the temperature of the fluid under treatment, or of the ambient temperature, may be compensated for, and rendered ineffective in the ultimate measurement.

Another object is to provide a device of the above nature which shall have an inherent tendency to damp out rapid fluctuations in the measured pressure without the need for constricted passages carrying the fluid under measurement.

Still another object is to provide a device of the above nature which shall be simple and rugged in construction, readily dis-assembled for cleaning, and capable of manufacture at a reasonable cost.

For this purpose it is proposed to provide a pressure-sensitive fitting including a smooth-bored tubular part having a deformable elastic wall, and adapted to carry a continuous stream of the fluid whose pressure is to be measured, said tubular part being enclosed within a non-deformable body part and separated therefrom by an annular chamber of variable volume adapted to contain an incompressible fluid through the medium of which deformations of said wall due to pressure of said first-named fluid may be measured in a pressure-sensitive instrument.

In the use of a tubular element deformable in response to internal fluid pressure, utilization may be made of either of two mechanical principles, the one involving a tubular element of normally non-circular cross-section and the other an element of normally circular section. It will be appreciated that the mechanisms of response of these two forms are essentially different. Thus, the tube of non-circular section under the influence of internal pressure will tend to assume a section having maximum internal area without change in periphery, which, of course, is a circle; and the principal stresses set up in its walls will be in the nature of bending stresses. The circular tube, on the other hand, can respond only in tension, the wall actually stretching under the applied internal pressure, with a corresponding increase in circumference. In either application, it is proposed to position the deformable tubular element within a chamber having non-deformable outer walls, so that the increase in cross-section area due to the approach of the non-circular tube to a circular section or to the increase in circumference of the circular tube, will produce a resultant reduction on section area of the surrounding annular space, with a corresponding reduction in volume of the chamber formed thereby, causing contained liquid to be forced out of the chamber.

It is further proposed to provide within said body part a chamber of constant volume, thermally associated with the variable volume chamber, and adapted to contain a liquid whereby may be obtained compensation for changes in the temperature of the liquid in the latter.

The nature of the invention, however, will best be understood when described in connection with the accompanying drawings, in which:

Fig. 1 is a front elevation, partly in vertical section, of a compound, internal-pressure-sensitive fitting with measuring instrument and embodying the principles of the invention.

Fig. 2 shows a transverse sectional view of the fitting taken on the line 2—2, Fig. 1 of the drawings and looking in the direction of the arrows.

Fig. 3 is a fragmentary vertical section, on an enlarged scale, showing certain structural details of the fitting.

Fig. 4 is a front elevation, partly in vertical section, of an alternative form of fitting embodying the principles of the invention.

Fig. 5 is a transverse sectional view of the same taken on the line 5—5, Fig. 4 of the drawings, and looking in the direction of the arrows; and Fig. 6 is a similar view showing an alternative form which may be normally assumed by the internal parts.

Figs. 7 and 8 are fragmentary vertical and horizontal sections, respectively, of an alternative form which may be taken by certain elements of the fitting.

Fig. 9 is a diagrammatic view of two elements embodying the invention, applied to the measurement of fluid flow in a closed conduit.

Referring to the drawings, more particularly Figs. 1 to 3 thereof, 10 designates an elongated cylindrical elements formed from a section of straight elastic metal tubing having end portions or flanges 11 and 12 left full size, the intermediate portion being reduced to form a thin wall adapted to yield in a tensile sense to internal fluid pressure, but not to acquire a permanent set under pressures of the order of those to be measured. Surrounding the element 10 is a similar tubular element 14 of an inside diameter the same as the outside diameter of the end portions 11 and 12, and having end portions or flanges 15 and 16 left full size, the intermediate portion being reduced, but not sufficiently to weaken materially the tube wall. Surrounding the element 14 is a tubular element 18 having an inside diameter the same as the outside diameter of the end portions 15 and 16, and its outside diameter uniform throughout its length.

A massive elongated metallic body part 19 has axially formed therethrough a cylindrical bore of diameter equal to the outside diameter of the tubular element 18, and adapted to contain and support the same together with the elements 14 and 10 when the latter are coaxially positioned therein.

Thus, with said tubular elements so positioned, there is formed a compound structure having an annular chamber 20 between the outer surface of element 10 and the inner surface of element 14, and another and coaxially disposed annular chamber 21 between the outer surface of element 14 and the inner surface of element 18, the tubular element 10 constituting a conduit adapted to carry a flowing fluid whose static pressure will be exerted against the yieldable walls of said element.

Through an aperture drilled in the end portion of element 10 is fitted a capillary tube 22 communicating with the chamber 20; and similarly a capillary tube 23 communicates with the chamber 21. The capillary tubes 22 and 23 are bent substantially at right angles and are carried through a lateral opening 24 formed in the body part 19. The outer end of said opening is threaded to receive a plug or nipple 25, serving as a guide for the capillary tubes, a partial closure for the opening 24, and for the mounting of armor or other desired protective means not shown in the drawings.

The assembly of the coaxial tubular elements and connecting capillary tubing being positioned within the body part 19 as shown in Fig. 1, the extremities of the tubular elements are sealed to each other by brazing or soldering, and to the body part by means of fillets of solder or thermoplastic or synthetic resin material or the like. This material is allowed to flow into the opening 24, securing the capillary tubes therein and retaining the plug or nipple 25 in its thread, and is formed at each extremity of the tubular elements into smooth flares 26 and 27, presenting no sharp corners or interstices subject to the accumulation of deposits or difficult to clean when the fitting is disassembled.

The body part 19 is formed with seats 28 and 29 on its respective ends, whereby connection may be made with union parts 30 and 31, forming elements in the piping system wherein pressures are to be determined; and the end portions are externally threaded to be engaged by suitable clamping rings 32 and 33, forcing said union parts into fluid-tight engagement with the seated ends of the body part 19, the whole constituting an annular, internal-fluid-pressure-sensitive device including a conduit part adapted to form a section in the piping system, and being readily removable therefrom for inspection and cleaning. The novel fitting, moreover, presents no objectionable obstructions, recesses, or interstices when assembled for use.

A pressure gauge suitable to use in conjunction with the apparatus hereinabove set forth may take the following form:

Upon a base 35 is mounted a Bourdon tube 36, adapted to have its free end deflected in a counter-clockwise sense upon the application of fluid pressure within the tube. Carried by the free end of said Bourdon tube is another Bourdon tube 37, adapted for deflection in an opposite or clockwise sense relative to its point of support upon the application of internal pressure. Carried by the free end of the Bourdon tube 37 is an index or pointer 38 adapted to be deflected thereby, and to provide by its deflection, relative to a graduated scale 39 mounted on the base 35, a measure of the deflection of the free end of the Bourdon tube 37 with respect to the base of the instrument. The interior space of the Bourdon tube 36 is placed in communication with the annular chamber 21 by means of the capillary tube 23 and the interior space of the tube 37 with the chamber 20 through a flexible section 40 forming a part of the capillary tube 22. Thus there are provided two closed, adjacent, but non-communicating, systems adapted to contain fluid or fluids and in respect to which the index or pointer 38 will respond differentially to similar changes in fluid pressure within said systems. The interior spaces of the systems are completely filled with an incompressible liquid such as kerosene, and sealed. The apparatus may thus be made inherently self-compensating for changes in volume of the contained liquids due to variations in temperature. For example, because of the intimate thermal association of the chambers 20 and 21, being separated only by the metallic wall 14, the liquids contained in these spaces will at all times attain substantially equal temperatures, and therefore will be subject to substantially similar volume changes with temperature variation. An increase in the volume of liquid in the chamber 20 due to an increase in temperature will cause some of the liquid to pass into the capillary tube 22, and thus force the Bourdon spring 37 to be deflected in a clockwise sense. At the same time, however, the temperature rise will be communicated to the liquid in the chamber 21, effecting a similar increase in volume, which, being communicated to the Bourdon spring 36, will deflect the same in a counter-clockwise sense. The volumes of the spaces 20 and 21 and the mechanical characteristics of the Bourdon springs being properly proportioned, the deflection of the Bourdon spring 36 may be caused exactly to neutralize that of spring 37, so that changes in temperature of the actuating liquids or of the parts with which they come in contact will have no effect upon the ultimate indication of the index 38 with respect to the scale 39.

In operation, the novel bulb assembly is connected by means of the union parts and clamping rings hereinabove set forth, into the pipe line in which pressures are to be measured. Upon an increase of fluid pressure within the pipe line, and therefore within the cylindrical element 10, the thin wall 13 of the latter will tend to yield, and will be strained in a sense to slightly increase the internal diameter of the tube. The volume of the annular chamber 20 will thus be reduced; and, as the thick wall 17 of the element 14 will remain substantially undistorted, some of the liquid in the chamber 20 will be forced out into the capillary tube 22, causing the index 38 to excurse along the scale 39, and provide a measure of the fluid pressure within the bulb. The constricted nature of the capillary tube 22 will tend to damp fluctuations in pressure, thus providing a relatively steady reading on the gauge 35 without the necessity of throttling or otherwise restricted orifices in the flow of the liquid within the pipe line. Moreover, by properly proportioning the dimensions of the capillary tube to those of other elements of the device and to the pressures involved, the degree of damping may be predetermined to a satisfactory degree of accuracy. At the same time, any change of the temperature of the fluid within the bulb or of the ambient atmosphere will affect the two opposed systems in equal and opposite senses, and will produce no resultant effect on the reading of the index 38. Thus, the Bourdon spring 37 may be said to function as a measuring element, while the spring 36 functions as a compensating element.

In the alternative form of bulb shown in Fig. 4 the coaxial arrangement of annular liquid chambers about the axis of the pipe line is maintained; but, instead of one chamber encircling the other as in the embodiment shown in the preceding figures, the chambers are longitudinally displaced, thus bringing the thick-walled compensating chamber into intimate thermal association with the fluid under measurement. This is accomplished by the use of the following structural embodiment: A tubular element 41 having an internal diameter suitable to carry the flow of the fluid under measurement is formed with its walls reduced to two different thicknesses. A portion 42 is turned down to a relatively thin section, adapted to yield, though not beyond its elastic limit, to the pressures to be measured. A portion 43 is turned down to an extent to provide an annular groove on the outside surface, but leaving a wall of sufficient thickness not to yield appreciably under the pressures encountered. End portions 44 and 45 are left the full diameter of the tubular stock, and an intermediate portion 46, also of the full diameter is left, to form a barrier between the two reduced portions.

A tubular element 47 having an internal diameter the same as the maximum diameter of the element 41 is placed over the latter to enclose the reduced portion 42, forming therewith an annular chamber 48, and having its inner end partially overlapping the intermediate barrier portion 46 of the element 41 and its outer end flush with the corresponding end of said element. A similar tubular element 49 is placed over the reduced portion 43 having its inner end partially overlapping the portion 46 and its outer end flush with the corresponding end of element 41, thus forming an annular chamber 50. The inner ends of the tubular elements 47 and 49 are sealed to the portion 46 as by brazing in a ring of silver solder 51, and the outer ends are similarly sealed to the unreduced end portions 44 and 45 of the element 41.

A capillary tube 52 is passed through the end portion 44 and sealed therein by brazing, placing its interior bore in communication with the chamber 48; and a capillary tube 53 is similarly passed through the end portion 45, placing its interior bore in communication with the chamber 50.

A massive metallic elongated body part 54 has formed axially therethrough a cylindrical bore of diameter equal to the outside diameter of the tubular elements 47 and 49, and is adapted to contain and support the same together with the enclosed element 41 when concentrically positioned therein. Lateral openings 55 and 56 near the extremities of said body part provide means for bringing the capillary tubes 52 and 53 to the outside surface of same; and the outer portions of said openings are threaded to accommodate plugs or nipples 57 and 58 adapted to guide and protect said capillary tubes and to provide mountings for armor or other protective devices not shown in the drawings. The extremities of the body portion 54 are seated and threaded in the conventional manner to provide convenient connection means to the pipe line in which fluid pressures are to be measured.

The assembly of the tubular elements 47 and 49, with the enclosed element 41 and attached capillary tubes, is positioned within the body part 54, the capillary tubes brought out through the lateral openings, and the whole sealed in position by means of fillets of solder or other material flowed in a liquid or plastic state into place, and allowed to enter the openings 55 and 56, solidifying there and securing the capillary tubes therein and retaining the plugs 57 and 58 in place. The fillets are formed at the extremities of the element 41 into smooth flares 59 and 59', presenting no sharp corners or interstices subject to the accumulation of deposits or difficult to clean when the device is disassembled. The whole assembly of the massive body part 54 with its enclosed tubular elements permanently attached thereto thus constitutes an annular internal-fluid-pressure-sensitive bulb adapted for all the purposes and applications of the corresponding element hereinabove described and shown in the preceding figures. For purposes of use, the capillary tube 52, communicating with the thin-walled chamber 48, is connected to the measuring system of a differential pressure gauge identical in all respects with the gauge 35 in Fig. 1; and the capillary tube 53 communicating with the thick-walled chamber 50 is connected to the "compensating" system of the gauge. Both systems are filled with an incompressible fluid, and sealed. Variations in temperature of fluid passing through the tubular element 41 will be communicated to the liquid in both chambers; and, these chambers being properly proportioned with respect to other elements of the associated measuring apparatus, there will be produced no resultant deflection of the pointer of the measuring instrument. Variations in pressure of the fluid within the element 41, however, will cause the wall portion 42 to yield, forcing some of the contained liquid through the capillary tube 52 into the "measuring" element of the gauge, while the relatively thick wall 43 will not yield appreciably, so that no corresponding deflection of the "compensating" element will be produced, with the result that the measuring instrument or pressure gauge will indicate upon its dial a measure of the pressure within the bulb, without respect to temperature of the fluid under measurement or of the surrounding atmosphere.

In Fig. 6 is shown an alternative form which may be given to the internal thin-walled pressure-sensitive tubular element without departing from the spirit of the invention. The circular tubular element 41 of the fitting shown in Fig. 5 is here replaced by an element 41' having its reduced portion of slightly flattened or elliptical section, such as would be obtained by applying a lateral compressive force before completing the assembly. The element 41' is positioned within the non-deformable tubular element 47' in a manner identical with the element 41, thus providing a surrounding chamber 48'. It will be obvious that internal fluid pressure will tend to increase the sectional area by causing the section to approach a circular form, effecting a corresponding reduction in the section area of the surrounding annular chamber, and a resultant decrease in its volume.

The chamber 48' being placed in closed communication with a suitable pressure gauge in a manner identical with that herein above set forth, and the system completely filled with liquid, any change in volume will be reflected in a change in the reading of the pressure gauge, thus providing a measure of fluid pressure within the deformable tubular element 41'. While the chamber 48' is shown as having a cylindrical exterior wall, it is obvious that, should such procedure be found desirable, the volume of contained liquid may be materially reduced by making this wall of a section having the form of an ellipse with its axes parallel to the corresponding axes of the section of element 41'.

In the form of construction shown in Figs. 7 and 8, there is illustrated an alternative form which may be assumed by the "compensating" chamber which is the chamber having the non-deformable wall. A body portion 60 similar in all respects to the body portion 54 shown in Fig. 4, has tightly positioned therein a pair of tubular elements 61 and 62, enclosing a tubular element 63, and forming therewith two annular chambers 64 and 65, each adapted to contain an incompressible fluid, and adapted for communication with the respective sides of a differential pressure gauge as hereinbefore set forth. The reduced wall portions 66 and 67 of the chambers 64 and 65, respectively, are formed by turning the material of the tubular element 63 down to substantially the same thickness for each chamber. The wall portion 66 is formed in a manner identical with the portion 42 shown in Fig. 4, being made of dimensions such that it will yield to fluid pressures of the order of those involved in the measurement. The wall portion 67, while reduced to substantially the same thickness as the portion 66, has left thereon a series of ring portions 68 of the original diameter of the tube, thus providing mechanically supporting members and rendering the wall portion 67 substantially rigid under the pressures involved. Communication between the several annular grooves between the rings 68 is provided by means of notches 69 formed in the rings 68, thus uniting the several interspaces into a substantially continuous chamber with walls so thin as to have substantially the same thermal conductivity as the walls of chamber 64 but so supported as not to be subject to appreciable deformation under pressure.

In Fig. 9 is shown a differential manometer element 70 having a pointer 71 adapted by its excursion with respect to a graduated scale 72 to provide a measure of difference of two fluid pressures applied to its measuring element through two tubular members 73 and 74. A conduit 75 adapted to carry a fluid whose rate of flow it is desired to measure, has placed in its course an orifice plate 76 of the conventional type used for such measurement. On each side of the orifice plate 76 are connected in the conduit fittings 77 and 78, each of the type hereinbefore disclosed, and adapted to reproduce variations in pressure of the fluid flowing therethrough as variations in pressure in a liquid contained in an auxiliary compartment. Said compartments or chambers of the fittings 77 and 78 are placed in communication respectively with the tubular members 73 and 74, whereby pressures are imparted to the manometer element 70, whose indications will thus become a measure of the rate of flow in the conduit 75 and through the orifice plate 76. Ordinarily the transfer of fluid from one to the other of the fittings 77 and 78 will be sufficient to maintain them at substantially the same temperature; and, with the respective tubular members 73 and 74 enclosed in a common metallic armor 79, they also will be maintained at a common temperature, so that the temperature compensating device shown as a part of the fitting where direct measurement of pressure is required, will become unnecessary where such measurements as that of flow are involved.

It will be obvious to those versed in the art that while for purposes of simplicity the invention has been shown as having an internal metallic surface directly in contact with the fluid whose pressure is to be measured, the sensitivity and accuracy of the device will not be adversely affected by lining the interior surface with a flexible enamel or by placing therein a thin-walled resilient tube of rubber, neoprene or the like, to protect the metallic surface from the action of corrosive fluids.

While the novel pressure-sensitive fitting in the several forms described is expressly designed and intended for insertion into a conduit to form a part thereof and to have flowing therethrough a continuous stream of the fluid under measurement, yet in certain installations there may be mechanical limitations making such an arrangement impracticable. In such instances it is to be understood that without in any way departing from the spirit of the invention the fitting may be capped at one end, thus forming a chamber adapted to contain a portion of the fluid whose pressure is to be measured, and placed in communication with the space in which pressure is to be measured by means of a single opening. Thus, while the scouring action of the flowing stream would not be present within the fitting, yet upon its being uncapped there would be presented a smooth continuous interior surface readily adaptable to cleansing by means of hot water and brushes or by any other method consistent with the requirements of perfect sanitation.

We claim:

1. In a device for measuring the pressure of a flowing fluid: a fitting including a conduit adapted to the internal passage of said fluid and having an axially extending elastic wall portion of circular cross-sectional contour transversely of the conduit, an enclosed body part surrounding said elastic wall portion to provide a closed chamber of variable volume, the chamber being completely filled with a fluid subjected to compressive force by deformation of said wall, and fluid-pressure measuring means in communication with said chamber.

2. In a device for measuring the pressure of a flowing fluid irrespective of temperature, the combination of an extended conduit of circular cross-sectional contour adapted to the internal passage of said fluid, said conduit having axially displaced wall portions of different characteristics, one being elastic and adapted to yield under the pressure to be measured, and another substantially rigid under said pressure, a rigid tubular member surrounding said conduit and being separated from its said wall portions by annular chambers enclosed thereby, together with a differential pressure gauge communicating respectively with said chambers and adapted to respond differentially to changes in pressure therein.

3. In a device for measuring the pressure of a flowing fluid irrespective of temperature, the combination of an extended conduit of circular cross-sectional contour adapted to the internal passage of said fluid, said conduit having axially displaced deformable wall portions, one adapted to yield under the pressure to be measured, and another having circular ribs to maintain said wall portion substantially rigid under said pressure, a rigid tubular member surrounding said conduit and being separated from its said wall portions by annular chambers enclosed thereby, together with a differential pressure gauge communicating respectively with said chambers and adapted to respond differentially to changes in pressure therein.

4. In a fluid-pressure-measuring device, the combination of a conduit of circular cross-sectional contour adapted to carry a stream of said fluid under pressure, said conduit having elastic wall portions, an extended, substantially rigid, tubular element surrounding said conduit and for a portion of its length separated therefrom by an annular sealed chamber, an extended body portion surrounding said tubular member, and for a portion of its length separated therefrom by a second annular sealed chamber concentric with said first-named chamber, means for connecting said body part into a pipe-line carrying said fluid, and a differential pressure gauge having oppositely-responding pressure-sensitive members communicating respectively with said chambers.

5. In a device for measuring the pressure of a fluid in a conduit: a fitting adapted to be incorporated as a portion of said conduit and including a tubular part having a yielding smooth wall portion defining a space adapted to enclose a body of said fluid, and a rigid part surrounding said tubular part spaced therefrom and forming thereabout an annular closed chamber coaxial with said tubular part, said yielding wall portion being common to said space and said chamber, whereby the volume of said chamber will vary with deformation of said yieldable wall portion with changes in pressure of said fluid, said chamber being filled with a liquid subjected to compressive force varying with said volume variation, and fluid-pressure measuring means in communication with said chamber.

6. In a device for measuring the pressure of a flowing fluid irrespective of temperature, the combination of a conduit of circular cross-sectional contour adapted for the internal passage of said fluid and having a wall portion deformable under pressure of said fluid, a first rigid tubular element surrounding said conduit and spaced therefrom by spacing elements to form a first sealed chamber coaxial therewith, a second rigid tubular element surrounding said first tubular element and spaced therefrom by spacing elements to form a second sealed chamber coaxial therewith, the walls of said conduit and said first tubular element being thermally conducting, and a differential pressure gauge having pressure responsive elements communicating respectively with said chambers.

7. In a device for measuring the pressure of a fluid in a conduit: a fitting adapted to be incorporated as a portion of said conduit and including a tubular part having a yielding smooth thermally-conducting wall portion defining a space adapted to enclose a body of said fluid, and a rigid part surrounding said tubular part spaced therefrom and forming thereabout an annular closed chamber coaxial with said tubular part, said yielding wall portion being common to said space and said chamber, whereby the volume of said chamber will vary with deformation of said yieldable wall portion with changes in pressure of said fluid, a second closed chamber of substantially constant volume interiorly isolated from said first chamber to be independent of pressure changes therein but in intimate thermal association therewith, said chambers being filled with separate bodies of liquid, the liquid in said first-named chamber being subjected through said yielding wall to compressive force varying with said volume variation, together with a differential pressure gauge communicating respectively with said chambers and adapted to respond differentially to pressure changes therein.

8. In a device for measuring the pressure of a flowing fluid: a fitting including a conduit adapted to the internal passage of said fluid and having an axially extending deformable elastic wall portion of non-circular cross-sectional contour surrounding said fluid, and subject to deformation with changes in the pressure of said fluid, an enclosed body part surrounding said portion and forming therewith a closed chamber, the chamber being completely filled with a fluid subject to compressive force by the deformation of said wall, and fluid-pressure measuring means in communication with said chamber.

9. In a device for measuring the pressure of a fluid in a conduit: a fitting adapted to be incorporated as a portion of said conduit and including a tubular part having a yielding smooth thermally conducting wall portion defining a space adapted to enclose a body of said fluid, and a rigid part surrounding said tubular part spaced therefrom and forming thereabout an annular closed chamber coaxial with said tubular part, said yielding wall portion being common to said space and said chamber, whereby the interior of said chamber will be in intimate thermal association with said fluid and the volume of said chamber will vary with deformation of said yieldable wall portion with changes in pressure of said fluid, a second closed chamber of substantially constant volume interiorly isolated from said first chamber to be independent of pressure changes therein and having a thermally conducting wall portion in intimate thermal association with said fluid, said chambers being filled with separate bodies of liquid, the liquid in said first-named chamber being subjected through said yielding wall portion to compressive force varying with said volume variation, and both said bodies of liquid tending through said conducting wall portions to assume the temperature of said fluid, together with a differential pressure gauge communicating respectively with said chambers and adapted to respond differentially to pressure changes therein.

JOHN F. INDERDOHNEN.
ALPHONSO NOBLE.